United States Patent [19]
Thompson

[11] Patent Number: 5,557,732
[45] Date of Patent: Sep. 17, 1996

[54] METHOD AND APPARATUS FOR PROTECTING SOFTWARE EXECUTING ON A DEMONSTRATION COMPUTER

[75] Inventor: Suzanne M. Thompson, Lexington, Ky.

[73] Assignee: International Business Machines Corporation, Armonk, N.Y.

[21] Appl. No.: 289,150

[22] Filed: Aug. 11, 1994

[51] Int. Cl.⁶ ........................................ G06F 3/14
[52] U.S. Cl. ............................. 395/161; 395/155
[58] Field of Search ................... 395/155, 157, 395/160, 161, 600, 650, 700, 800, 163, 425, 725; 365/63

[56] References Cited

U.S. PATENT DOCUMENTS

| | | | |
|---|---|---|---|
| 5,265,221 | 11/1993 | Miller | 395/490 |
| 5,293,494 | 3/1994 | Saito et al. | 395/700 |
| 5,432,729 | 7/1995 | Carson et al. | 365/63 |
| 5,444,559 | 8/1995 | Warnar et al. | 395/85 |

*Primary Examiner*—Mark R. Powell
*Assistant Examiner*—Ruay Lian Ho
*Attorney, Agent, or Firm*—Daniel E. McConnell; Bookstein & Kudirka, P.C.

[57] ABSTRACT

Demonstration (demo) application software and various utility software programs are configured as a novel "protected demonstration environment" having layered security mechanisms for protecting the integrity of software executing on a computer. The security mechanisms include an underlying activity timer for ensuring that the demo program is periodically running in the absence of user input activity. When the demo program is not running, additional security mechanisms, such as message filters and icon disablers, are provided to reduce the vulnerability of the system. These security mechanisms cooperate to provide users access to certain innocuous features of the software through a graphical desktop interface on a computer screen, while preventing access to potentially destructive features.

18 Claims, 7 Drawing Sheets

METHOD AND APPARATUS FOR PROTECTING SOFTWARE EXECUTING ON A DEMONSTRATION COMPUTER

FIELD OF THE INVENTION

This invention relates generally to computer systems and, more specifically, to an improved environment for protecting software executing on a demonstration computer system.

BACKGROUND OF THE INVENTION

A window environment is system software that manages interactions between a user and an application program executing on a computer through a graphical display portrayed on a display screen of the computer. The graphical display is typically arranged to resemble the surface of an electronic "desktop" and an application program running on the computer is represented as one or more electronic paper sheets displayed in rectangular regions of the screen called "windows". Specifically, the application program presents information to the user through its window by drawing images, graphics or text within the window region. The user, in turn, communicates with the application by "pointing at" standard graphical objects in the window with a pointer that is controlled by a pointing device, such as a mouse, and then selecting the objects, or by typing information into a keyboard. Selection of the objects may be effected by actuating the mouse to move the pointer onto or near the objects and pressing and quickly releasing, i.e., "clicking", a button on the mouse, or by manipulating a cursor via the keyboard.

The graphical objects typically included with each window region are sizing boxes, buttons and scroll bars. These objects represent user interface elements that the user can point at with the pointer to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus which are generally available to a user. Each menu, in turn, provides a list of command options that can be selected merely by pointing to them and clicking on them with the mouse-controlled.

In general, the desktop metaphor facilitates user efficiency by presenting a means by which a user can easily organize applications. Typically, applications are organized on the desktop into predefined "groups" of application programs and related program files. Each of these applications are represented by a small picture called an "icon". The user can arrange, create and delete the icons and their associated groups displayed on the desktop. These applications may be opened from a predefined group, at which time they run in "application windows" that are visible on the desktop. The open application windows can be minimized to appear as icons without quitting the applications.

There are a number of different window environments commercially available which utilize the arrangement described above. These environments include the System 7® operating system developed by Apple Computer, Inc., the Windows® graphical user interface developed by the Microsoft Corporation and the OS/2 Presentation Manager® developed by International Business Machines Corporation. The present invention is applicable to all such environments and is concerned with protecting application and system software programs executing on a computer system that is accessible to many different users, such as a demonstration computer.

Manufacturers and distributors of computer systems typically provide specially-designed software programs that demonstrate certain features of their systems. Personnel concerned with selling and purchasing these systems often desire to "play" with the computers in order to become more familiar with the software and their features. This is particularly true in retail distribution, where potential customers frequently interact with application and system software through a desktop of the window environment executing on the demonstration computers.

However, these customers often erase or destroy the software, typically when there are no sales people present. One solution to this costly problem requires that user enter a password prior to accessing the demonstration software. Yet, this solution has proven unsatisfactory because a customer can only use the computer when a sales person is available. Moreover, if the sales person inadvertently leaves the system "unlocked" in the presence of customers, security is compromised.

Therefore, it is among the objects of the present invention to provide a protected environment in which to run demonstration software on a computer system.

SUMMARY OF THE INVENTION

The invention resides in a novel "protected demonstration environment" for protecting the integrity of software executing on a computer. In general, the protected demonstration environment comprises a reasonably secure demonstration application program, i.e., the demo program, and various utility programs associated with an operating system, each of which interact to provide a plurality of layered security mechanisms. As described further herein, the security mechanisms cooperate to provide users access to certain innocuous features of the software through a graphical desktop display on a computer screen, while preventing access to potentially destructive features.

In one aspect of the present invention, the protected demonstration environment includes an underlying "activity timer" for ensuring that the demo program is periodically running in the absence of user input activity. Here, the activity timer monitors the input activity of a user via mouse or keyboard entries when the desktop is portrayed on the screen. If there is a lack of user interaction for a predetermined period of time, the activity timer exits the desktop display and restarts the demo program.

However, additional security mechanisms are required to reduce the vulnerability of the system during the time period when the demo program is not running. As an example, a user may access potentially harmful utility programs, represented by application icons displayed on the desktop screen, from the desktop when the demo program is idle. To discourage such activity, an "icon disabler" mechanism is provided in another aspect of the invention to replace the potentially harmful utility program icons with an innocuous "dummy" program. The icon disabler comprises a special group file for these utility programs that is configured to display a message indicating that these features are not available in response to a user's attempt to activate the icons.

Despite the activity timer and icon disabler, a user may still access the utility programs by, e.g., selecting various menu bar options available on desktop. A "message filter" is therefore also provided as part of the protected demonstration environment for blocking user access to these potentially destructive menu bar options. Preferably, the message filter comprises a message filtering program operating in connection with conventional windows environment system software to render as visible on the display screen, but functionally inactive, the destructive menu bar options.

Finally, a concealing mechanism provides a top layer of the protected demonstration environment to impede user access to selected system program files containing operating system commands that allow the user to modify or delete program files of the system. In the illustrative embodiment of the invention, an attribute operating system command is used to "hide" these system files from display on a computer screen, thus inhibiting the user's access to those files.

Advantageously, the layered security mechanisms described herein provided a novel protected demonstration environment that is particularly useful in a retail store where accidental or intentional destruction of the software by potential customers is likely and, thus, may be obviated.

BRIEF DESCRIPTION OF THE DRAWINGS

The above and further advantages of the invention may be better understood by referring to the following description in conjunction with the accompanying drawings, in which.

DESCRIPTION OF THE PREFERRED
EMBODIMENT(S)

Figure 1:
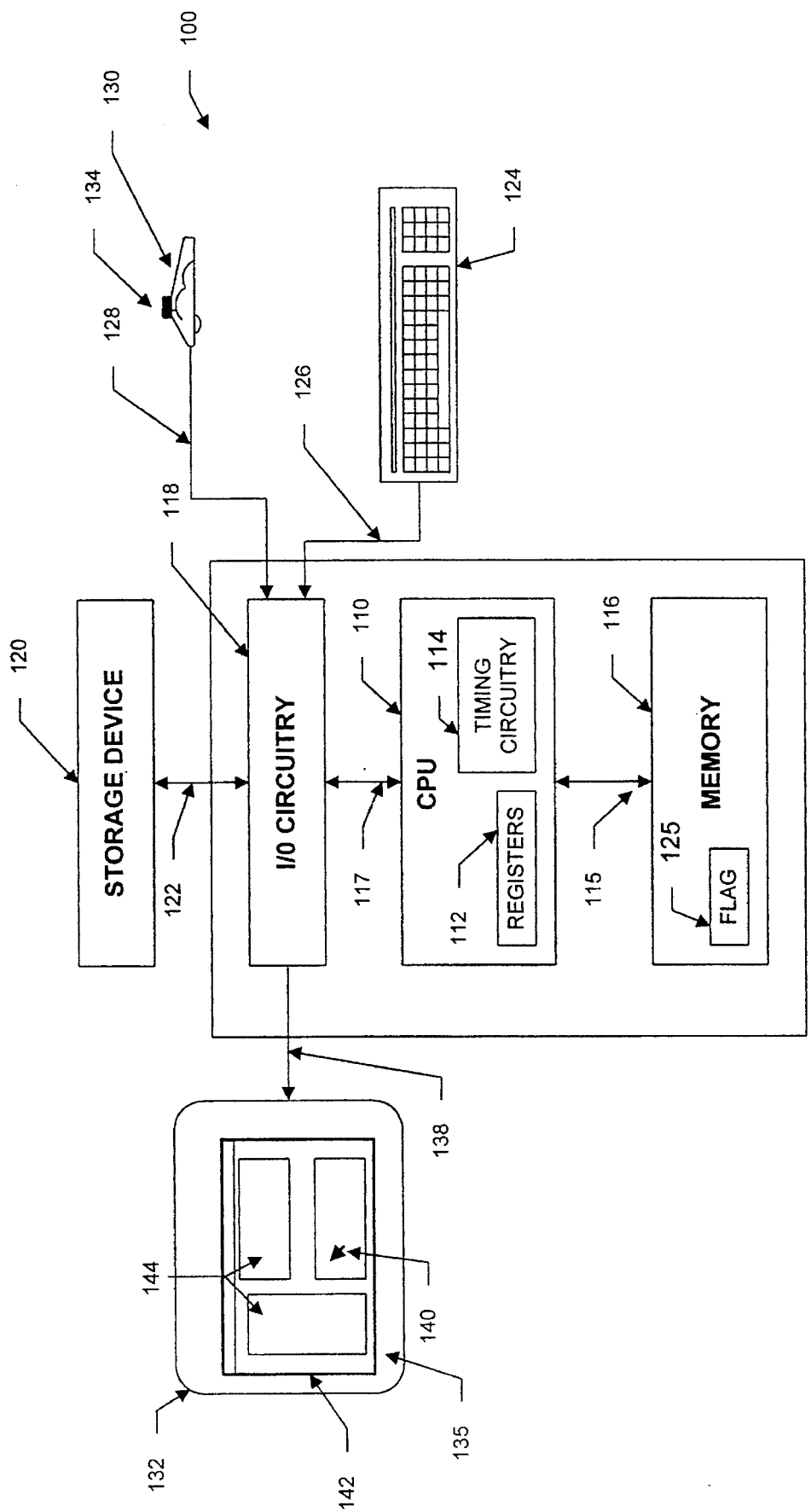
FIG. 1 is a schematic block diagram of a computer system, such as a personal computer system, on which an inventive protected demonstration environment may advantageously operate.

FIG. 1 is a schematic illustration of computer system 100 comprising a central processing unit (CPU) 110 coupled between a memory 116 and input/output (I/O) circuitry 118 by bidirectional buses 115 and 117. The CPU 110 includes components such as registers 112 and timing circuitry 114 that are configured to provide hardware clocks for the system 100. The memory 116, on the other hand, typically comprises random access memory (RAM) for temporary storage of information, including application programs and portions of the an operating system, and read only memory (ROM) for permanent storage of the computer's configuration and basic operating commands. A portion of the memory 116 is allocated as an activity flag 125 for operation in connection with the hardware clock components of CPU 110, as described further herein.

The I/O circuitry 118 is connected to a storage device 120, such as a disk drive, via a bidirectional bus 122, and to cursor/pointer control devices, such as a keyboard 124 (via cable 126) and a mouse 130 (via cable 128). The mouse 130 typically contains at least one button 134 operated by a user of the system. A conventional display monitor 132 having a display screen 135 is also connected to I/O circuitry 118 via a cable 138. A pointer (or cursor) 140 is displayed on the screen 135 and its position is controllable via the mouse 130 or the keyboard 124, as is well known. Specifically, the I/O circuitry 118 receives information, such as control and data signals, from the mouse 130 and keyboard 124, and provides that information to the CPU 110 for storage on the device 120 or for display on the screen 135. It is to be understood that the I/O circuitry contains the necessary hardware and software, e.g., buffers, adapters and protocols, needed to interface with the storage device, mouse, keyboard and display monitor.

The computer system 100 is preferably a personal computer of the IBM® PS/I® series of computers sold by International Business MachinesCorporation, although the invention may also be practiced in the context of any computer. These computers have resident thereon, and are controlled and coordinated by, operating system software, such as the IBM OS/2® operating system or the Microsoft® MS-DOS® operating system. In addition, a window environment, such as the Windows® graphical user interface, is preferably displayed on the screen 135 as a graphical display to facilitate interactions between a user and the computer 100. The graphical display is typically arranged to resemble a desktop 142 and each application program executes in an application window 144 of the screen 135.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the windows 144 for presentation to the user.

As noted, manufacturers and distributors of computer systems typically provide specially-designed application programs that demonstrate certain features of their systems. Yet, there is a serious concern that potential customers may accidentally or intentionally destroy the application programs and other software executing on a demonstration computer. The present invention, however, features the provision of utility programs which, when invoked, cause actions to take place that protect the integrity of demonstration software executing on the computer. This new behavior of the system is brought about by the interaction of these utility routines with a series of additional system routines associated with the operating system. Together, these system software routines interact with the application program to create a novel "protected demonstration environment", as described herein.

Figure 2:
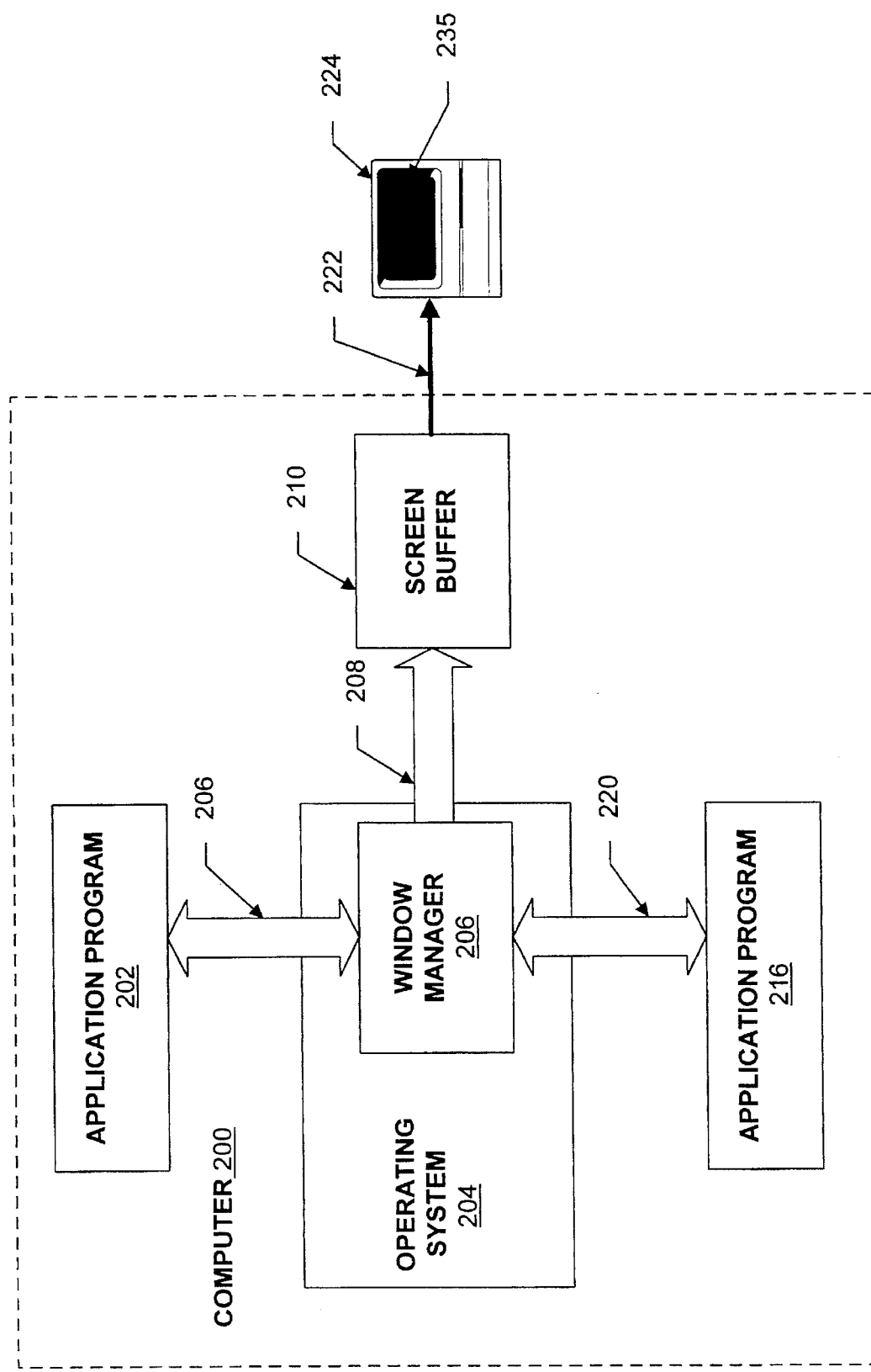
FIG. 2 is a block diagram showing the interactions between application programs and an operating system to provide the protected demonstration environment in accordance with the invention.

FIG. 2 is a schematic illustration of the interaction of application programs 202 and 216, and an operating system 204 to provide the protected demonstration environment on a computer system 200, which is similar to, and has equivalent elements of, the computer system 100 of FIG. 1. The application programs and the operating system interact to control and coordinate the operations of the computer and their interaction is illustrated schematically by arrows 206 and 220. In order to display information on a screen display 235, application programs 202 and 216 generate and send display commands to a window manager program 206 of the operating system 204. The window manager program 206 stores the information directly (via arrow 208) into a screen buffer 210.

Under control of various hardware and software in the system, the contents of the screen buffer 210 are read out of the buffer and provided, as indicated schematically by arrow 222, to the display screen 235 of a monitor 224. As noted, the screen buffer 210, as well as a display adapter (not shown), are contained in I/O circuitry which converts the information in the buffer 210 to a form which can be used to drive the screen 235.

As also noted, the application programs interact with the window manager and other system software routines to provide the novel protected demonstration environment. The window manager is a system software routine that is generally responsible for managing the window that the user views during operation of the application programs. That is, it is generally the task of the window manager to keep track of the location and size of the window and window areas which must be drawn and redrawn in connection with the system 200.

Figure 3:
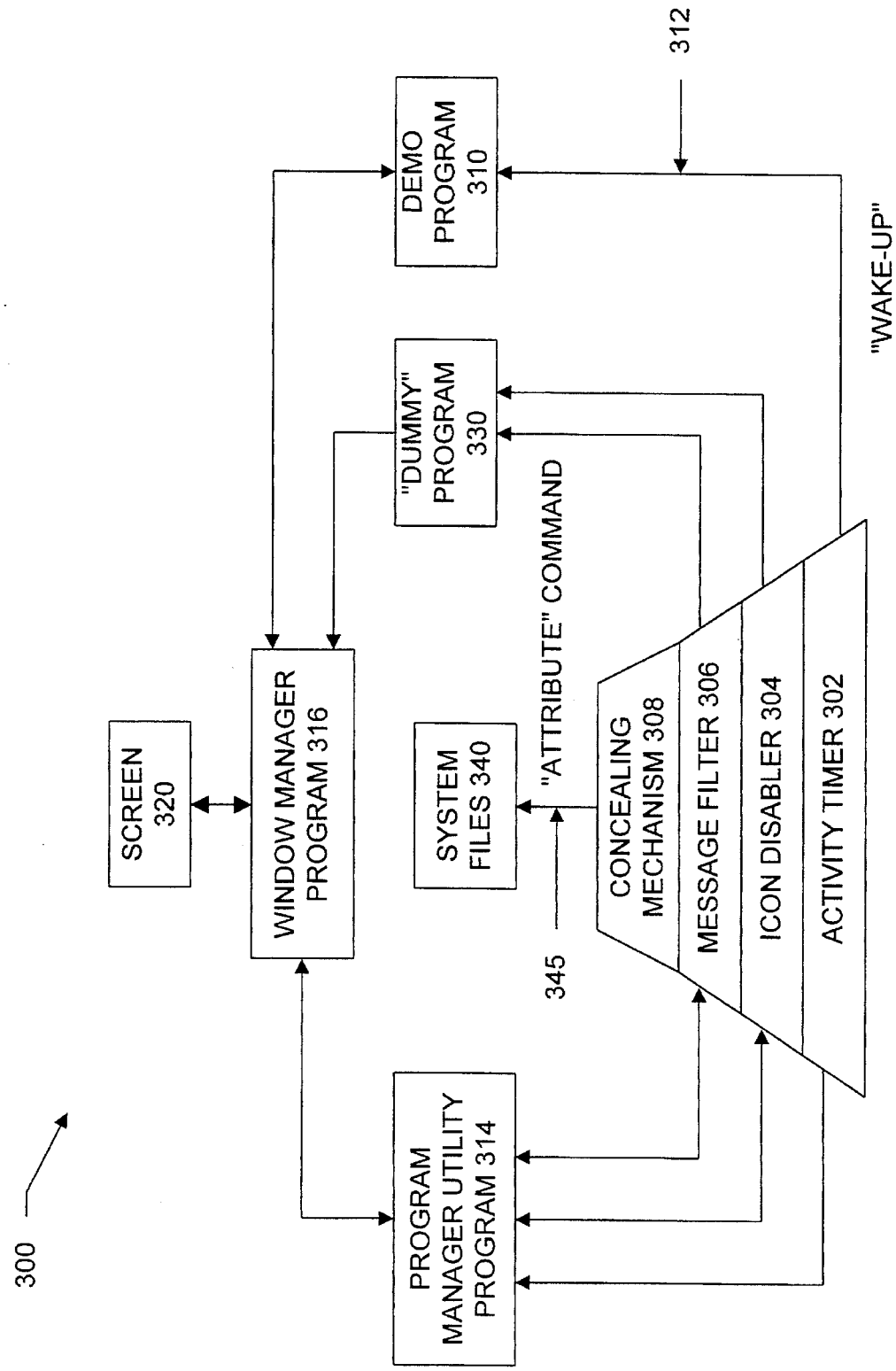
FIG. 3 is a highly schematized block diagram of the protected demonstration environment including a plurality of layered security mechanisms in accordance with the invention.

In accordance with the invention, the protected demonstration environment includes a plurality of security mechanisms configured as a layered arrangement and shown as a highly schematized block diagram in FIG. 3. As can be seen, the environment 300 includes a base, underlying activity timer 302 together with three higher security layers represented as an icon disabler 304, a message filter 306 and a concealing mechanism 308. Collectively, these security mechanisms cooperate with other components of the system to allow users access to certain innocuous features of the software, while preventing access to potentially destructive features.

Specifically, the underlying activity timer 302 is configured to ensure that one of the application programs, called the demonstration (demo) program 310, is periodically running in the absence of user input activity via the mouse 130 or keyboard 124 (FIG. 1). The demo program generally functions to exhibit features of the system; moreover, it is a reasonably secure application that is configured to obviate termination during execution. In other words, once the demo program is running, typical means for terminating the program, e.g., <CTL><ALT><DELETE>, are disabled. However, to ensure that a knowledgeable user of the system, such as a salesman, has an opportunity to exhibit other software features of the computer, there is a brief period of time during which the demo program is not executing. During this time, a utility program, together with a window manager program 316, present a desktop graphical display on the computer screen 320. In the illustrative embodiment of the invention, the utility program is preferably a Program Manager program 314 of the Windows® graphical user interface.

The activity timer 302 may be implemented as a software counter operating in connection with system software routines and hardware clocks of the computer system. For example, the activity timer 302 provides scheduled "wake-ups", as illustrated schematically by arrow 312, of the demo program 310 as a result of changes in the hardware clock including registers 112 of CPU 110 (FIG. 1), which are regularly updated by timing circuitry 114. Upon reaching a predetermined threshold count, the timer 302 examines the activity flag 125 in memory 116, which is manipulated by the demo program 310 monitoring any mouse and keyboard input activity.

Figure 4:
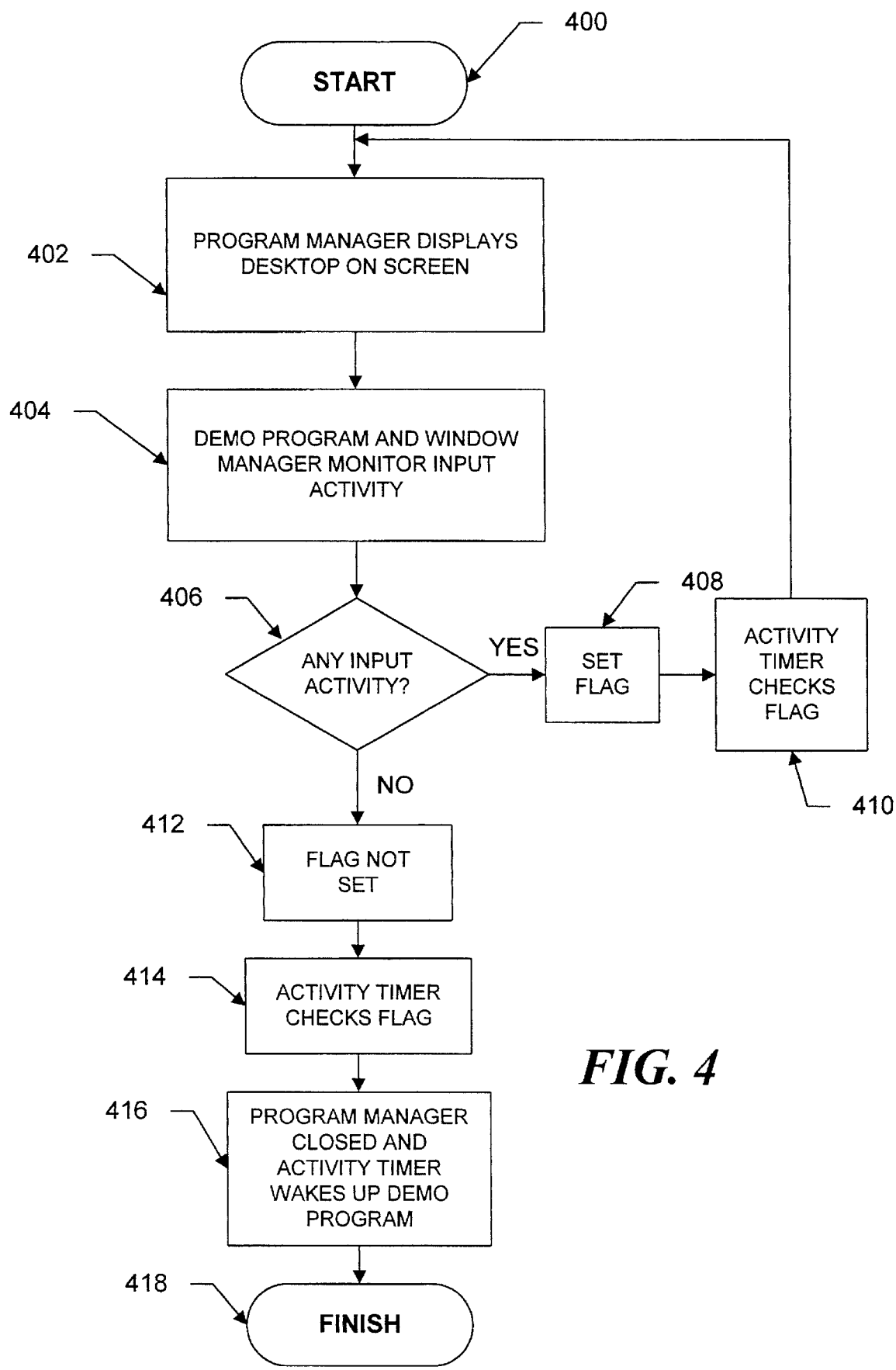
FIG. 4 is an illustrative flowchart of the method for operating an activity timer of FIG. 3.

FIG. 4 illustrates the sequence of steps for operating the activity timer. The routine starts in Step 400 and proceeds to Step 402 where the Program Manager utility program 31 4 is executing on the computer to portray a desktop on a computer screen 320. In Step 404, the demo program 310 interacts with the window manager 316 to monitor the presence of input activity from a mouse or keyboard and, in Step 406, if there is user input activity, the demo program 310 controls the CPU 110 to set the flag 125 in memory 116 (Step 408). Thereafter, the activity timer 302 counts to the predetermined threshold and then checks the flag in Step 410. Since the flag is set, the routine returns to Step 402.

If there is no user input activity in Step 406, the flag 125 is not set in Step 412. The activity timer 302 checks the flag in Step 414 and, since it is not set, the routine proceeds to Step 416 where the Program Manager 314 is closed (exits), the activity timer "wakes-up" the demo program 310 and the CPU restarts that program for display on the screen. The routine then finishes in Step 418.

The activity timer 302 generally provides a solid foundation for protecting the software resident in the system; however, during the predetermined period of time during which the timer is counting, the system is vulnerable to attack. Accordingly, various other security mechanisms are provided for "filling-in" this time period during which the system is exposed to accidental or intentional destruction.

One such security mechanism is an icon disabler, shown at 304 in FIG. 3, for replacing potentially harmful applications represented by the icons displayed on the Program Manager 314 with an innocuous "dummy" program 330. In the illustrative embodiment of the invention, these potentially harmful application icons represent various utility programs within the Program Manager 314 such as, e.g., File Manager, DOS Prompt, Control Panel and PIF Editor. These programs enable the user to access the underlying operating system, e.g., MS-DOS, along with such files as autoexec.bat, which allows a user to run programs automatically when starting MS-DOS, and config.sys, which allows a user to change the system's configuration settings. In accordance with the invention, the icon disabler 304 comprises the creation of a special group file for these application icons. Specifically, the properties of these files are configured to access the dummy program file 330 that operates in connection with the window manager 316 to display a message on the screen 320 indicating that these features are not available.

Figure 5:
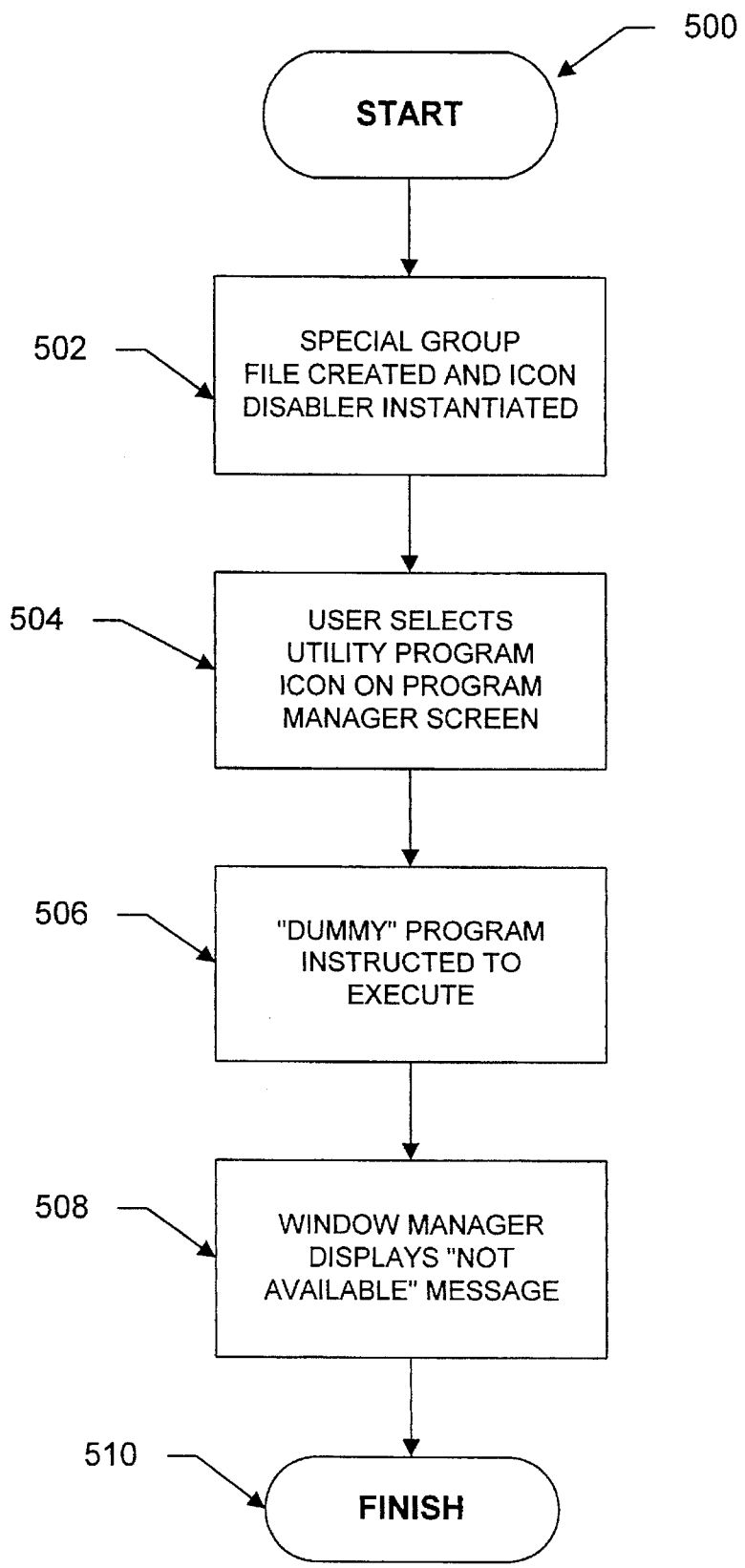
FIG. 5 is an illustrative flowchart of the method for operating an icon disabler associated with the protected demonstration environment of FIG. 3.

FIG. 5 is an illustrative flowchart of the method for operating the icon disabler. The routine starts in Step 500 and proceeds to Step 502 where a special group file is created. For the preferred embodiment described herein, creation of a new group file comprises accessing the file menu within Program Manager 314 (with a mouse or keyboard) and choosing the command "New". A new program object dialog box appears and a program group option is selected which results in the appearance of a program group properties dialog box. However, in accordance with the invention, the file name of the dummy program 330 is entered in the group file field box, thereby instantiating the icon disabler function 304.

In Step 504, a user selects, i.e., "clicks" on, a utility program icon displayed on the Program Manager desktop using the (keyboard) mouse and, in Step 506, the icon disabler 304 interacts with the Program Manager 314 and window manager 316 to process the user's input selection and instruct the dummy program 330 to execute. In Step 508, the dummy program 330 instructs the window manager 316 to draw a message box on the screen 320 displaying the following message: "This feature is not available on the demonstration machine." The routine then finishes in Step 510.

As noted, the icon disabler 304 operates to disable potentially harmful application icons portrayed on the Program Manager screen. However, a user may still access these utility programs via another approach, such as the menu bar options available on Program Manager 314. Referring again to FIG. 3, a message filter 306 is thus provided as part of the protected demonstration environment 300 to block user access to these destructive menu bar options. Preferably, these items are available from a file menu of the Program Manager 314 and include, e.g., New, Move, Copy, Delete, Properties and Run command items. These items generally allow a user to alter the contents of the groups displayed on the Program Manager screen. Specifically, disabling the "File Run" item prevents the user from starting a DOS prompt, File Manager and other items that are disabled.

In accordance with the invention, the message filtering function 306 operates in connection with the Program Manager utility program 314 and window manager 316 to render these destructive menu bar options visible on the display screen 320, but functionally inactive. Preferably, the message filter comprises a message filtering program that instructs the window manager 316 to "capture" these menu bar option messages intended for the Program Manager 314 and redirect the messages to the dummy program 330, which executes and displays the "not available" message.

Figure 6:
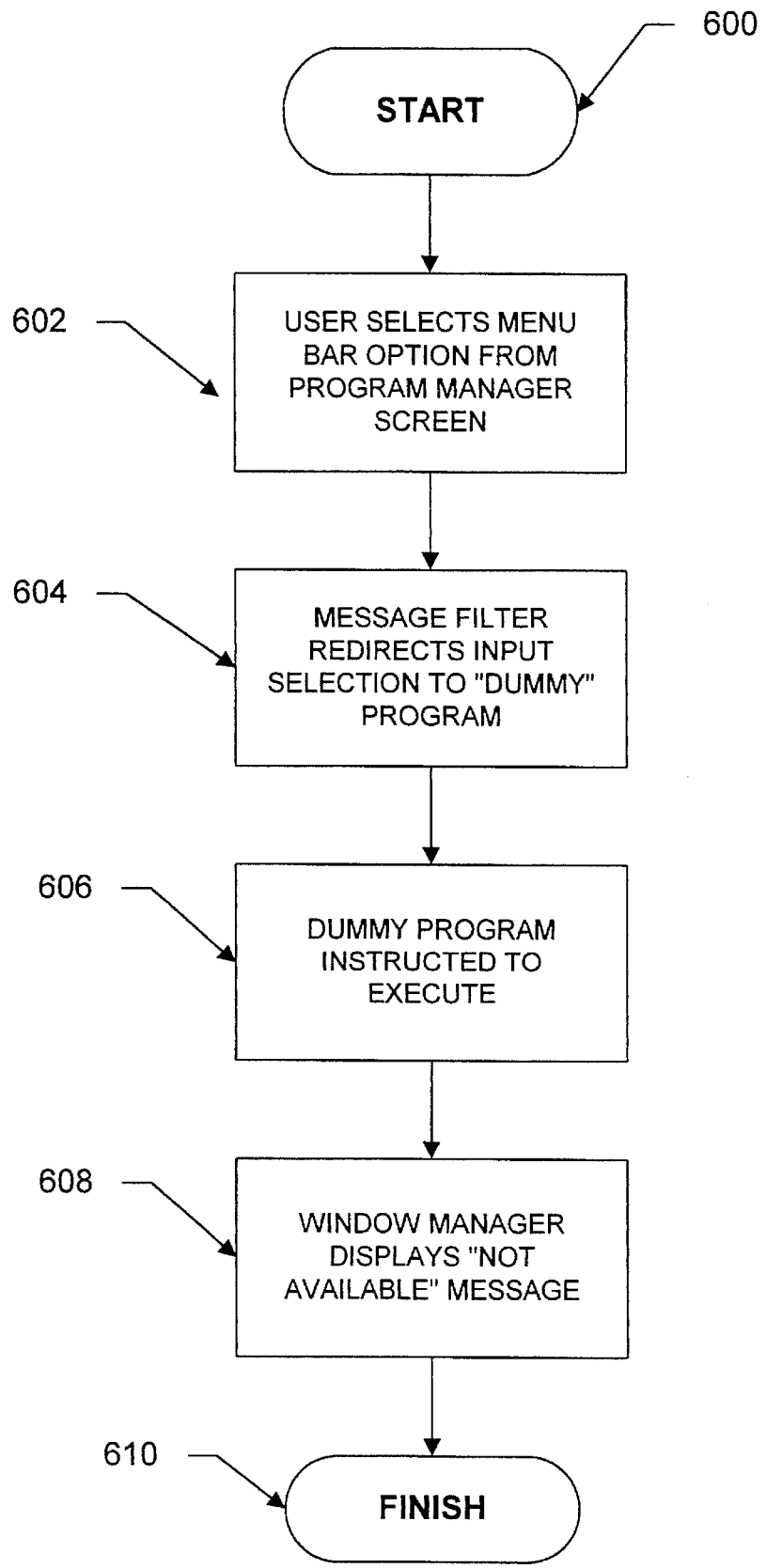
FIG. 6 is an illustrative flowchart of the method for operating a message filter associated with the protected demonstration environment of FIG. 3.

FIG. 6 is a flowchart illustrating the sequence of steps for operating the message filter 306. The routine starts in Step 600 and proceeds to Step 602 in which a user accesses the menu bar of the Program Manager desktop screen to select an option. In Step 604, the message filter program interacts with the Program Manager 314 and window manager 316 to process the user's input selection and redirect it to the dummy program 330 where, in Step 606, the dummy program is instructed to execute. In Step 608, the dummy program sends a message to the window manager instructing it to draw a message box on the screen displaying the following message: "This feature is not available on the demonstration machine." The routine then finishes in Step 610.

Another security mechanism provided by the protected demonstration environment is a concealing mechanism 308 that impedes user access to selected system program files that contain operating system commands. One such program file is command.com which, in the illustrative embodiment of the invention, allows the user to start a DOS prompt and possibly modify or delete software programs in the system. Referring once again to FIG. 3, the concealing layer 308 of the environment 300 comprises use of an attribute operating system command, schematically illustrated by arrow 345, to "hide" the attributes of such system files 340 and prevent their display on the computer screen 320.

Figure 7:
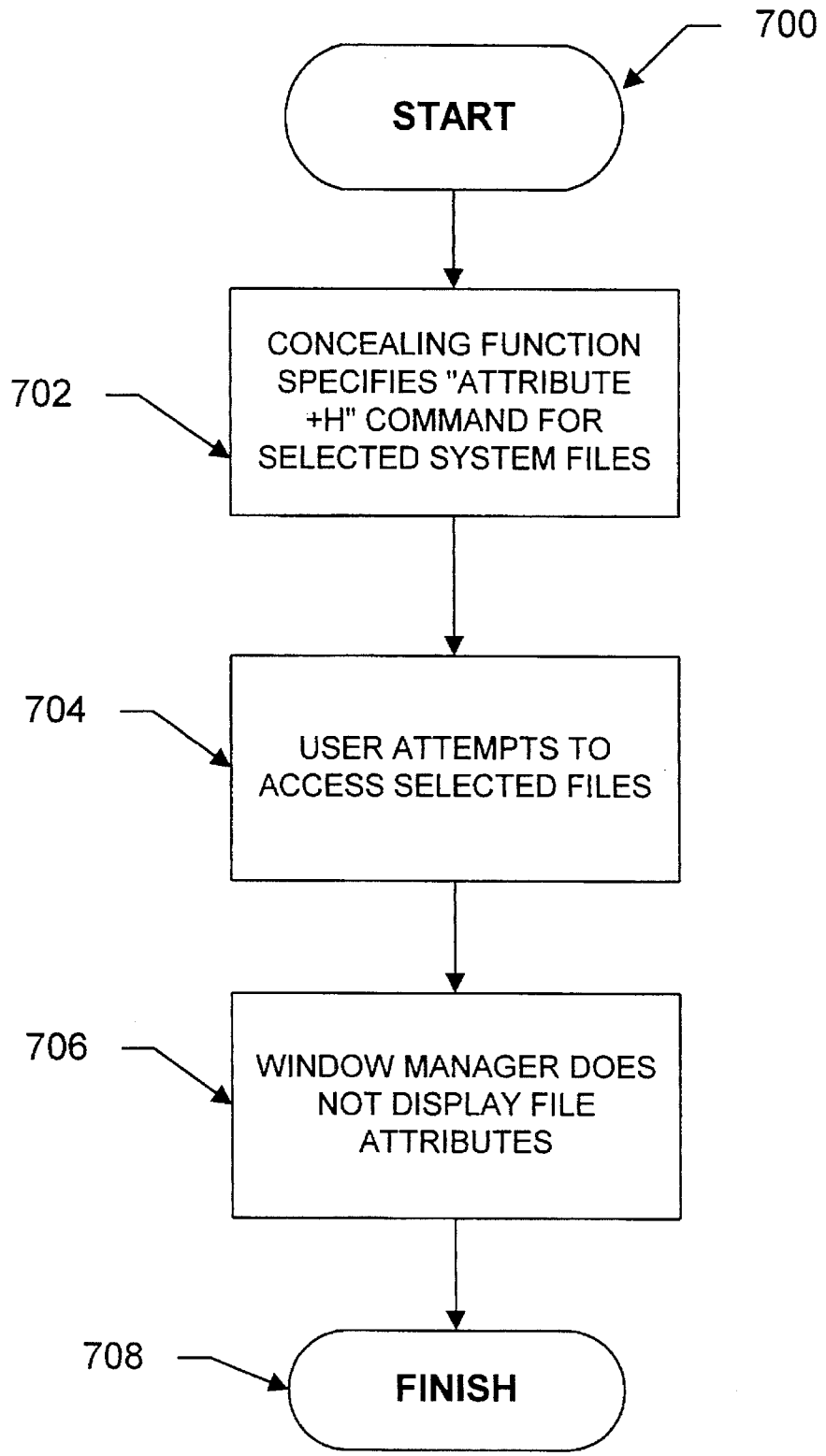
FIG. 7 is an illustrative flowchart of the method for activating a concealing mechanism associated with the protected demonstration environment of FIG. 3.

FIG. 7 is an illustrative flowchart of the method for activating the concealing mechanism. The routine starts in Step 700 and proceeds to Step 702 where, during installation of the demonstration software, the attribute command is specified, along with <+h> option, as the statement: attrib +h c: <file name>, in accordance with the concealing function 308. In Step 704, a user attempts to access one of these concealed files 340 and, in Step 706, the demo program 310 interacts with the window manager 316 to prevent display of the file attributes in accordance with the concealing function 308, thereby inhibiting the user's access to those files. It is to be understood that although the program files are not displayed, they are still available for execution in the system. The routine then finishes in Step 708.

While we have described illustrative embodiments for a protected demonstration environment having layered security mechanisms that obviate accidental or intentional destruction of the software by potential users, including customers in a retail environment, it is to be understood that various other adaptations and modifications may be made within the spirit and scope of the invention. For example, additional system software routines may used when implementing the invention in various applications. These additional system routines include dynamic link libraries (DLL), which are program files containing collections of window environment functions designed to perform specific classes of operations. These functions are invoked as needed by the application (demo) program to perform the desired operations. Specifically, the DLLs, which are generally well-known, may be used to interact with the application programs and window manager to provide the protected demonstration environment.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus for protecting the integrity of software executing on a computer having a processor for executing system software programs to generate a display on a computer screen and a memory, said computer operating in an environment in which users of various skill levels and motivations are operating said computer, said apparatus comprising:

a demonstration application program located in said memory and having a predetermined run length;

means for periodically operating said demonstration program to exhibit hardware and software features of said computer, said demonstration application program configured to prevent user termination of said demonstration program during execution;

a utility program cooperating with said system software programs to generate a graphical desktop display on said computer screen during a period of time when said demonstration application program is not executing, said graphical desktop display allowing access to said system software programs through manipulation of said graphical desktop display;

means for preventing access to selected ones of said system software programs of said computer through manipulation of said graphical desktop display on said computer screen by said users; and means for inhibiting user termination of said utility program.

2. The apparatus of claim 1 wherein said preventing means comprises a plurality of layered security mechanisms cooperating with various hardware and software components of said computer.

3. The apparatus of claim 2 wherein a first of said layered security mechanisms comprises an activity timer for ensuring that said demonstration application program is periodically executing in the absence of user input activity.

4. The apparatus of claim 3 wherein a second of said layered security mechanisms comprises an icon disabler for replacing selected utility programs represented by application icons portrayed on said graphical desktop display during said period of time with a security program, said security program, when executed, cooperating with said system software programs to display on said display screen a predetermined message.

5. The apparatus of claim 4 wherein said icon disabler comprises a special group file for said selected utility programs configured to display said predetermined message, in response an attempt to activate said application icons, in cooperation with said security program.

6. The apparatus of claim 4 wherein a third of said layered security mechanisms comprises a message filter for blocking user access to selected menu bar options available from said graphical desktop display during said period of time.

7. The apparatus of claim 6 wherein said message filter comprises a message filtering program operating in connection with said window manager program to render as visible on the screen, but functionally inactive, said selected menu bar options.

8. The apparatus of claim 6 wherein a fourth of said layered security mechanisms comprises a concealing mechanism for impeding user access to selected system program files containing system commands for one of modifying and deleting program files of said computer.

9. The apparatus of claim 8 wherein said concealing mechanism comprises use of a predetermined operating system command for preventing display of attributes of said system program files on the screen, thereby inhibiting user access to said system program files.

10. A computer having apparatus for protecting the integrity of software executing thereon, said computer operating in an environment in which users of various skill levels and motivations are operating said computer and having a display screen that facilitates user input activity, said computer comprising:

a processor for executing software programs stored in a memory, said processor having components including a register and timing circuitry for providing a clocking function;

an operating system cooperating with said processor to execute a demonstration application and to control said display screen;

a demonstration application program periodically operating to exhibit hardware and software features of said computer, said demonstration application program having reasonably secure characteristics that prevent user termination during execution;

a utility program operating to generate a graphical desktop display on said display screen during a period of time when said demonstration application is not executing, said graphical desktop display including icon graphics representing programs in said operating system;

a window manager program of said operating system, said window manager cooperating with said utility program for displaying said graphical desktop display on said display screen; and a plurality of layered security mechanisms cooperating with said processor components and said programs to prevent access to said operating system programs of said computer through manipulation of icons on said graphical desktop display on said screen.

11. A method for protecting the integrity of software executing on a computer operating in an environment in which users of various skill levels and motivations are operating said computer and having a processor for executing system software programs to portray a graphical desktop display on a computer screen that facilitates user input activity, said method comprising the steps of:

periodically executing a demonstration application program to exhibit hardware and software features of said computer, said demonstration application program configured to prevent user termination during execution;

operating a utility program to generate a visual display substantially the same as said graphical desktop display on said computer screen during a period of time when said demonstration application program is not executing;

drawing application windows with a window manger to display said visual display; and preventing access to selected system software programs of said computer through manipulation of said graphical desktop display on said computer screen.

12. The method of claim 11 further comprising the step of ensuring that said demonstration application program is periodically executing in the absence of user input activity.

13. The method of claim 12 further comprising the step of replacing selected utility programs represented by application icons portrayed on said graphical desktop display during said period of time with a dummy program.

14. The method of claim 13 further comprising the step of blocking user access to selected menu bar options available from said graphical desktop display during said period of time.

15. The method of claim 14 further comprising the step of impeding user access to selected system program files containing system commands for one of modifying and deleting program files of said computer.

16. The method of claim 15 wherein said step of impeding comprises the step of using a predetermined operating system command for preventing display of attributes of said system program files on the screen, thereby inhibiting user access to said system program files.

17. A computer program product for protecting integrity of software executing on a computer having a processor, a display screen and system software programs executing on said processor, said computer program product comprising:

a computer usable medium having computer readable program code means embodied in said medium, said program code means including:

a demonstration application program for execution on said processor, said demonstration application program running for a predetermined execution time and being structured to prevent user termination of said demonstration application program during execution;

means for periodically executing said demonstration program on said processor to demonstrate hardware and software features of the computer;

a utility program for cooperation with said system software programs to generate a graphical desktop display on said display screen during a period of time when said demonstration application program is not executing, said graphical desktop display allowing access to said system software programs through manipulation of said graphical desktop display;

means for preventing access to selected ones of said system software programs of said computer through manipulation of said graphical desktop display on said display screen by said users; and means for inhibiting user termination of said utility program.

18. The computer program product as defined in claim 17, wherein the means for preventing access comprises a plurality of layered computer readable security instructions that cooperate with various hardware and software components of said computer.

* * * * *